United States Patent [19]

Uchinami

[11] Patent Number: 5,301,648
[45] Date of Patent: Apr. 12, 1994

[54] ELECTRONIC CONTROL DEVICE FOR AN INTERNAL COMBUSTION ENGINE

[75] Inventor: Masanobu Uchinami, Hyogo, Japan

[73] Assignee: Mitsubishi Denki Kabushiki Kaisha, Tokyo, Japan

[21] Appl. No.: 986,808

[22] Filed: Dec. 8, 1992

[30] Foreign Application Priority Data

Dec. 9, 1991 [JP] Japan .................... 3-324280

[51] Int. Cl.⁵ .............................................. F02D 43/04
[52] U.S. Cl. ...................... 123/491; 123/494; 123/585; 123/1 A
[58] Field of Search ............... 123/1 A, 478, 480, 491, 123/494, 585

[56] References Cited

U.S. PATENT DOCUMENTS

| | | | |
|---|---|---|---|
| 4,438,749 | 3/1984 | Schwippert | 123/494 |
| 4,706,629 | 11/1987 | Wineland et al. | 123/1 A |
| 4,945,863 | 8/1990 | Schmitz et al. | 123/1 A |
| 5,060,619 | 10/1991 | Sakurai et al. | 123/494 |
| 5,150,683 | 9/1992 | Depa et al. | 123/494 X |
| 5,179,926 | 1/1993 | Ament | 123/494 |
| 5,186,149 | 2/1993 | Kitajima et al. | 123/491 |

*Primary Examiner*—Willis R. Wolfe
*Attorney, Agent, or Firm*—Sughrue, Mion, Zinn, Macpeak & Seas

[57] ABSTRACT

When or just after an engine (1) is started, a starting switch (9) is turned on and a value is set in a just-after-starting counter in a CPU (114). The starting or just-after-starting state is detected. Fuel temperature and fuel properties are detected by a fuel properties sensor (16). The detected values are calculated in the CPU (114). Fuel temperature detection output is corrected, then a filter value or average value is calculated and stored in RAM (114b) in the CPU (114) and just after the engine is started, based on the stored value, driving of a bypass control valve (6) and an injector (12) is controlled and the fuel amount or air amount is controlled for the engine. Thereby, it is enable optimum fuel amount control when and just after an engine is started regardless of the differences in the fuel properties.

4 Claims, 6 Drawing Sheets

ELECTRONIC CONTROL DEVICE FOR AN INTERNAL COMBUSTION ENGINE

BACKGROUND OF THE INVENTION

Field of the Invention

This invention relates to an electronic control device for an internal combustion engine for improving capabilities of controlling the fuel and air amount when, or just after, the internal combustion engine is started.

Description of Conventional Art

Conventional fuel control when, or just after, an internal combustion engine is started is used to detect an engine temperature and determine the starting fuel amount in response to the temperature, or to determine a fuel increment in response to the engine temperature at starting and, just after the engine is started, decrease the increment gradually with time.

Conventional air amount control when, or just after, an internal combustion engine is used started is to detect an engine temperature and determine the starting air amount in response to the temperature, or to determine an air amount increment in response to the engine temperature at starting and, just after the engine is started, decrease the increment gradually with the time.

However, the conventional fuel control and air amount control do not give any special consideration to the fuel properties and performance matching so as to optimize the fuel amount and air amount when, and just after, an engine is started with respect to specific fuel properties.

Specific examples in which the differences in fuel properties cause a problem are alcohol blend gasoline, heavy gasoline, etc. Alcohol has a large specific gravity as compared with regular gasoline and also has a low Reid vapor pressure (RVP). Heavy gasoline has a high distillation temperature and a low Reid vapor pressure (RVP); it has features of a large specific gravity and a high octane value as compared with regular gasoline.

When alcohol blend gasoline or heavy gasoline is used for running an engine with an electronic control device which controls the fuel amount and air amount matched with regular gasoline, instability of engine rotation, particularly when and just after the engine is started, becomes a problem. In the worst case, the engine cannot be started or just after the engine is started, an engine failure (engine stop) occurs and exhaust gas also becomes worse.

The possible cause is as follows: Reid vapor pressure is low and when and just after the engine is started, fuel adheres to an air intake pipe, etc., thus the substantial fuel feed amount lowers, thereby increasing the air-to-fuel ratio and causing a fuel failure to occur.

However, the conventional electronic control device for an internal combustion engine, which is configured as described above, does not give consideration to the control capabilities when, or just after, the engine is started with respect to the differences in fuel properties in controlling the fuel and air amount, thus results in drastic deterioration of the control capabilities for any fuel other than a specific fuel. Thus, the engine cannot be started or just after the engine is started, the rotation speed of the engine is extraordinarily low and an engine failure is prone to occur.

SUMMARY OF THE INVENTION

Accordingly, it is an object of the invention to provide an electronic control device for an internal combustion engine which can prevent the capabilities of controlling fuel feed and air feed, when or just after the engine is started, from becoming worse due to the differences in fuel properties and can perform optimum fuel and air amount control based on the fuel properties.

According to the invention, there is provided an electronic control device for an internal combustion engine which comprises a fuel properties sensor for detecting fuel properties of the internal combustion engine, calculation and storage means for calculating and storing output values of the fuel properties sensor, and control means responsive to the fuel properties sensor output values stored on the calculation and storage means for correcting a fuel amount or air amount fed to the engine for optimum control in accordance with the fuel properties when the engine is started.

The fuel properties sensor in the invention uses the differences in the refractive indices of fuel to distinguish between the fuel properties of regular gasoline and those of alcohol blend or heavy gasoline for giving filter treatment or for averaging the fuel properties sensor output values and storing the result with the calculation and storage means. Then, the controller identifies the fuel properties from the differences in the refractive indices of regular gasoline and alcohol blend gasoline in response to the value stored in the calculation and storage means. In response to the refractive index of fuel, the controller increases the fuel amount when and just after the engine is started as compared with that of regular gasoline if the fuel is not regular gasoline, thereby improving the fuel control capabilities regardless of the fuel properties.

For air amount control when, and just after, the engine is started, the controller identifies the fuel properties in response to the value to which filter treatment is given or the average value stored in the calculation and storage means. In response to the refractive index of fuel, the controller increases the air amount when and just after the engine is started as compared with that of regular gasoline if the fuel control capabilities regardless of the fuel properties.

DESCRIPTION OF THE PREFERRED EMBODIMENTS

Referring now to the accompanying drawings, there is shown a preferred embodiment of an electronic control device for an internal combustion engine of the invention.

Figure 1:
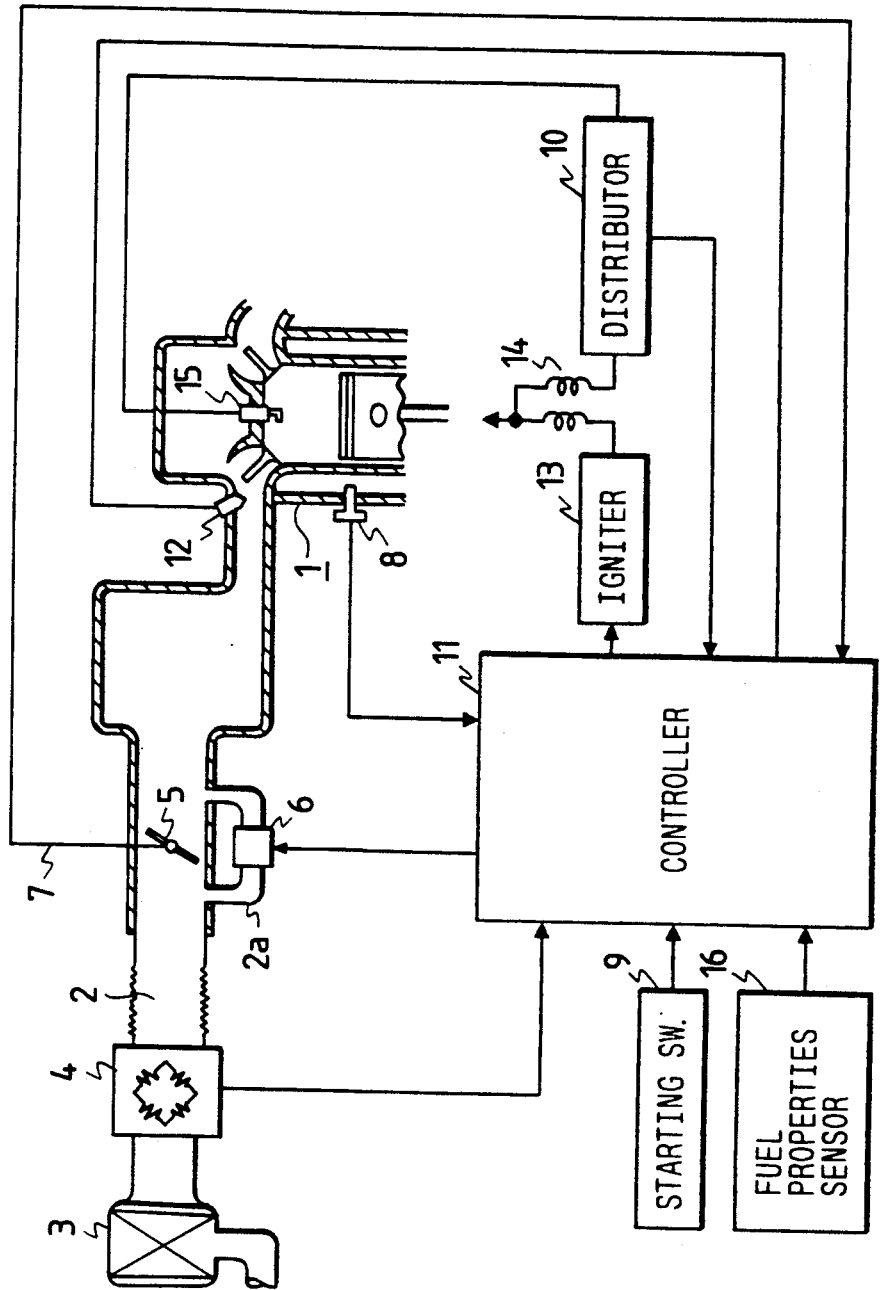
FIG. 1 is a block diagram showing the configuration of an electronic control device for an internal combustion engine according to one embodiment of the invention.

FIG. 1 is a block diagram showing the configuration of the embodiment, wherein an internal combustion engine and sensors, an actuator, and a controller attached to the engine are shown.

In FIG. 1, numeral 1 is an internal combustion engine to which an air intake passage 2 is connected. An air cleaner 3, an air intake sensor 4, and a throttle valve 5 are disposed at predetermined positions on the air intake passage 2. A bypass passage 2a of the air intake passage 2 is located before and after the throttle valve 5. A bypass control valve 6 is disposed at the bypass passage 2a.

Numeral 7 is a throttle open sensor for sensing to what degree the throttle valve 5 is opened. A detection output of the throttle open sensor 7 is fed into a controller 11. Numeral 8 is a temperature sensor for sensing an engine temperature. A detection output of the temperature sensor 8 is also fed into the controller 11. Numeral 9 is a starting switch for detecting the starting state of the internal combustion engine 1. The starting switch 9 is also connected to the controller 11.

Figure 2:
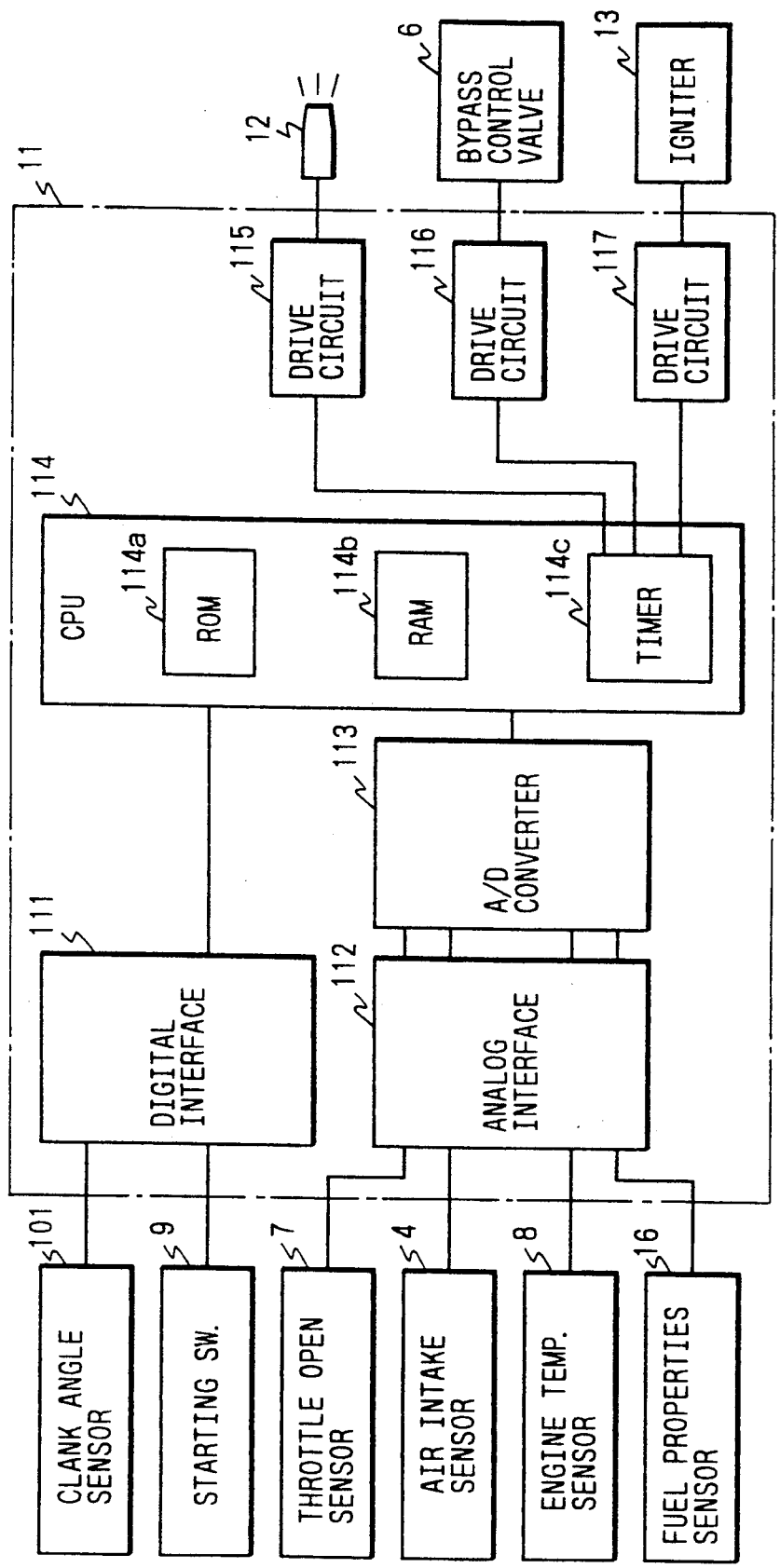
FIG. 2 is a block diagram showing the internal and peripheral configurations of a controller in the embodiment.

Numeral 10 is a distributor which contains a crank angle sensor 101 as shown in FIG. 2. When high voltage is applied to an ignition coil 14, the distributor 10 is adapted to distribute high voltage to an ignition plug 15. The rotation speed of the internal combustion engine 1 can be detected by the crank angle sensor 101. Numeral 16 is a fuel properties sensor which outputs an output signal and fuel temperature signal corresponding to the refractive index of fuel to the controller 11. In response to the input signals, the controller 11 drives an injector 12 for fuel control and the bypass control valve 6 for air amount control; it also drives an igniter 13 for causing the ignition coil 14 to generate high voltage.

FIG. 2 is a block diagram showing the configuration of the controller 11 shown in FIG. 1. In FIG. 2, a digital interface 111 is a circuit for feeding digital signals of a crank angle sensor 101, a starting switch 9, etc., to a CPU (central processing unit) 114; an analog interface 112 is an interface circuit for converting analog signals of a throttle open sensor 7, an air intake sensor 4, an engine temperature sensor 8, a fuel properties sensor 16, etc., into digital signals; and an analog-to-digital (A/D) converter 113 is adapted to convert output of the analog interface 112 into digital signals for feeding into the CPU 114.

The CPU 114 contains a ROM 114a (read only memory), a RAM 114b (random access memory), and a timer 114c, and is responsive to the above-mentioned input signals for controlling drive circuits 115, 116, and 117 as described below. The drive circuit 115 drives an injector 12 and the drive circuit 116 drives a bypass control valve 6. The drive circuit 117 drives an igniter 13 for causing an ignition coil 14 to generate high voltage. Even after a key switch is turned off, power is supplied to the RAM 114b in the CPU 114 for enabling data to be stored in the RAM 114b.

Figure 3:
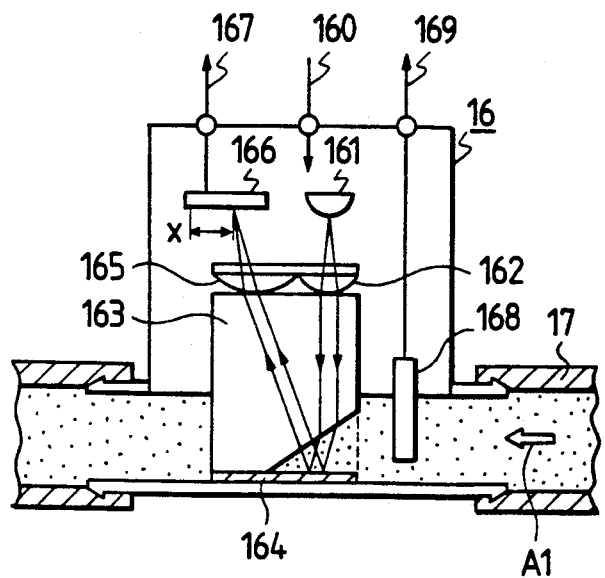
FIG. 3 is a drawing for illustrating operation of a fuel properties sensor applied to the embodiment.

FIG. 3 is an explanatory view of a fuel properties sensor 16, and shows how the fuel properties are detected according to the difference in the refractive indexes of fuel. In FIG. 3, the fuel properties sensor 16 is disposed in a fuel pipe 17. Arrow A1 shown in the fuel pipe 17 indicates the flow direction of fuel.

Numeral 160 is power supply input, numeral 161 is an LED (light emitting diode), numeral 162 is a collimating lens for making light from the LED 161 parallel light, and numeral 163 is a rod prism. Light passed through the rod prism 163 is refracted on the boundary with fuel in accordance with the ratio of the refractive indices of both, then is reflected by means of a light reflector 164 and again refracted on the boundary, then is concentrated on a PSD (one-dimensional position detection sensor) 166 by a condenser lens 165.

Therefore, the concentration position on the PSD 166 is determined conforming to the refractive index of fuel. Photocurrent of the PSD 166 is converted into voltage to provide output voltage 167. The refractive index of fuel is affected by fuel temperature, and thus needs to be corrected in response to the fuel temperature. For this purpose, a fuel temperature sensor 168 is installed in the fuel passage to generate a fuel temperature signal 169.

Figure 4:
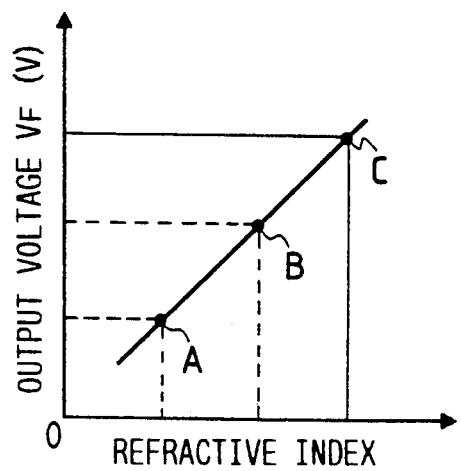
FIG. 4 is an output characteristic graph of the fuel properties sensor shown in FIG. 3.

FIG. 4 is a characteristic graph showing the output characteristic of the fuel properties sensor 16, wherein the refractive index is used to enter the horizontal axis of the graph and output voltage VF is used to enter the vertical axis. Regular gasoline, alcohol blend gasoline, and heavy gasoline indicate A, C, and B points in the graph, respectively.

Figure 5:
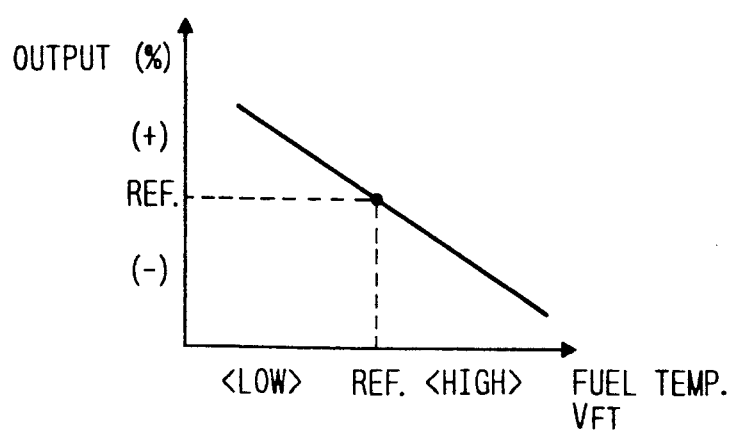
FIG. 5 is a characteristic graph showing the relationship between output of the fuel properties sensor shown in FIG. 3 and fuel temperature.

FIG. 5 is a characteristic graph showing the relationship between output of the fuel properties sensor 16 and fuel temperature VFT. As seen in the figure, when the fuel temperature is higher than the reference value, the output voltage becomes lower than the reference value, thus affection of the fuel temperature can be removed by executing output correction of the differences from the reference value.

Figure 6:
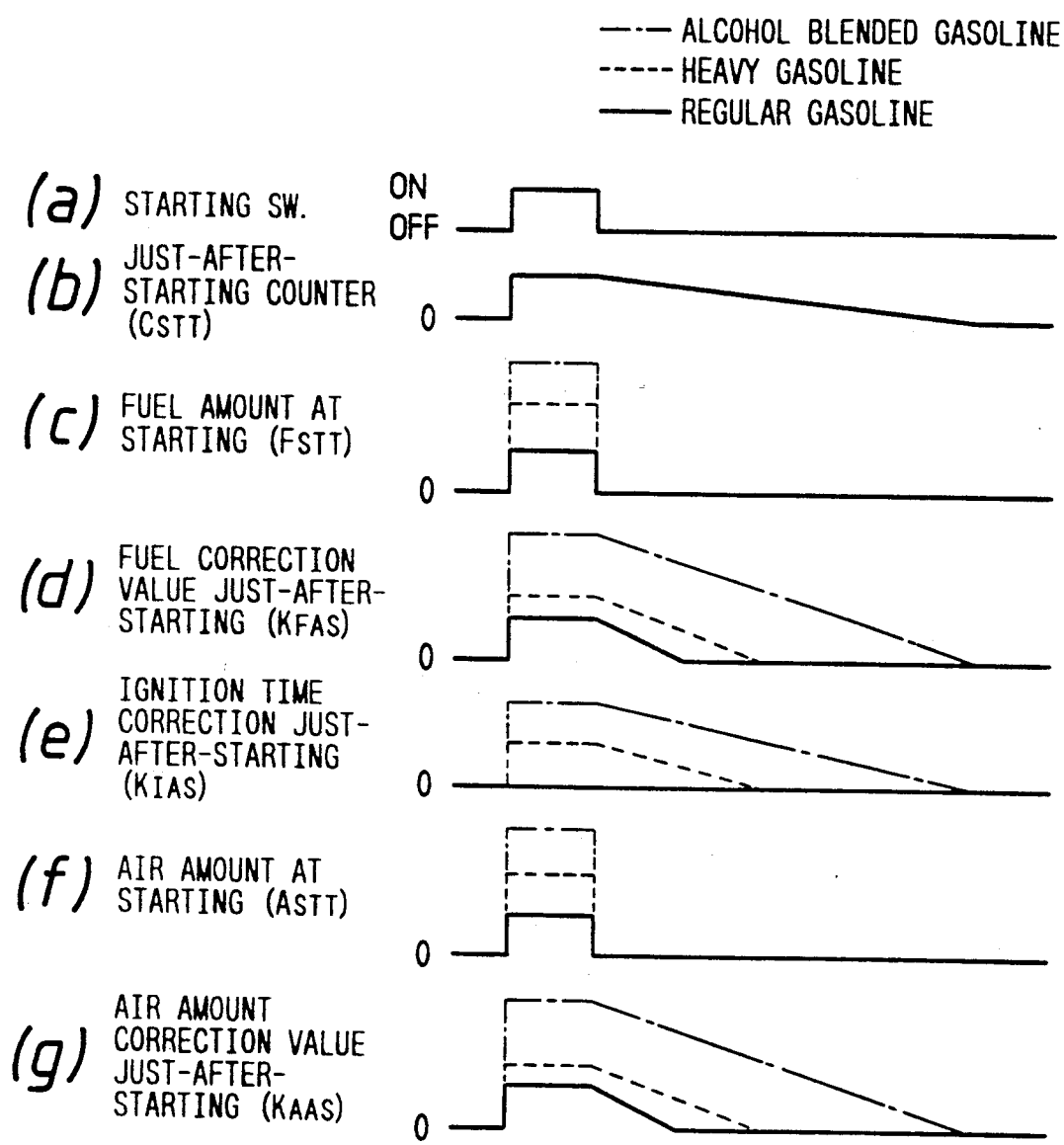
FIGS. 6(a)–(g) are timing charts for illustrating operation of an engine applied to the embodiment when and just after the engine is started.

FIG. 6 is a timing chart showing operation of the invention when and just after an engine is started, and illustrates operation for the fuel amount and air amount at starting and the fuel correction value, ignition time correction amount, and air amount correction value just after starting. The operation is described in detail in conjunction with FIG. 8 below.

Referring now to FIG. 6, operation of the preferred embodiment is described. As shown in (a), when the engine is started, first the starting switch 9 is turned on, thereby detecting the starting state. At the same time, as shown in (b), a value is set in a just-after-starting counter CSTT (not shown in FIGS. 1-3, but contained in CPU 114). After the starting switch 9 is turned off, the just-after-starting counter CSTT decreases to zero gradually with the time. The just-after-starting state is detected according to the counter value.

Figure 7:
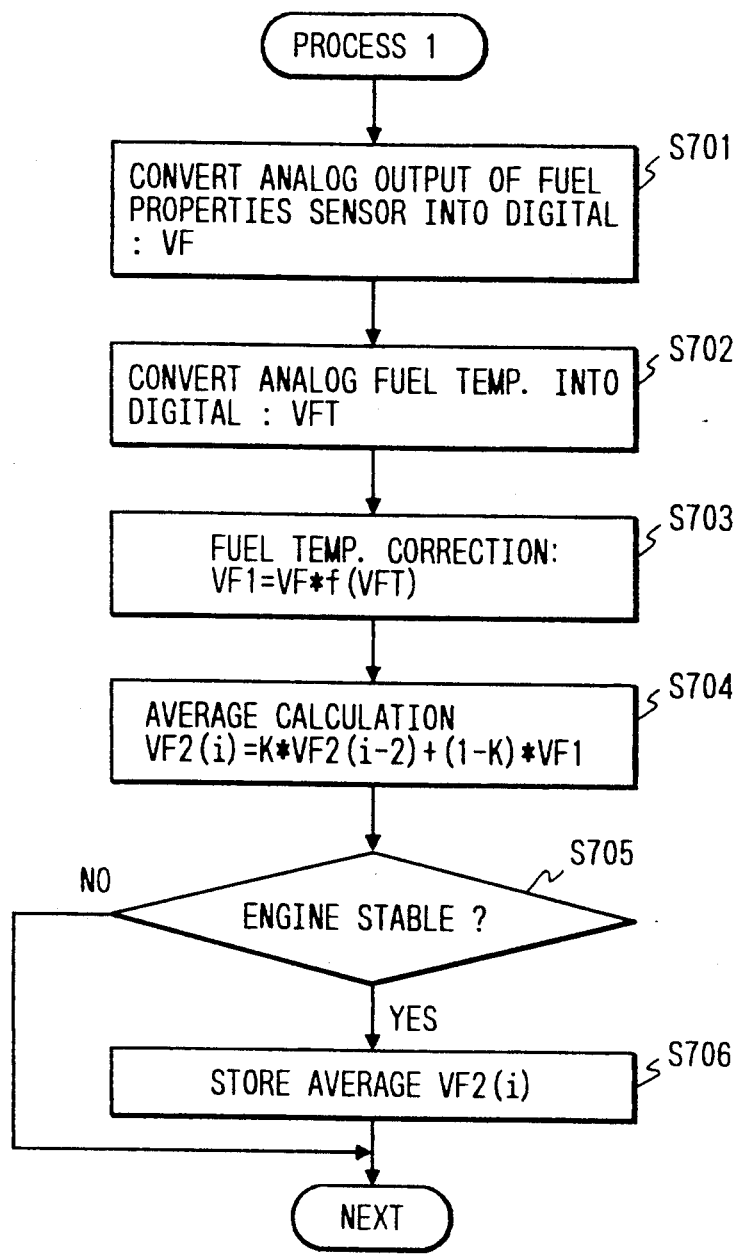
FIG. 7 is a flowchart showing a processing sequence for judging fuel properties in response to the value calculated and stored by the controller according to output of the fuel properties sensor in the embodiment.

The fuel amount at starting, as shown in (c), and the air amount at starting, as shown in (f), are constant values in accordance with a cooling water temperature, which represents an engine temperature, in the starting state. The values are corrected with the value corresponding to the fuel properties detected by the fuel properties sensor 16 and calculated and stored with calculation and storage means as shown in FIG. 7 below. When the gasoline is detected as alcohol blend or heavy gasoline, the fuel amount and air amount at starting are increased as compared with regular gasoline.

Next, in the just-after-starting state after the starting switch 9 is turned off, the fuel correction value just after starting shown in (d), the ignition time correction value just after starting shown in (e), and the air amount correction value just after starting shown in (g) found from the calculated and stored value from the engine temperature sensor 8 and the fuel properties sensor 16 at starting are decreased gradually in accordance with the value of the just-after-starting counter CSTT.

The correction values just-after-starting are also set in accordance with the calculated and stored value from the fuel properties sensor. When the gasoline is alcohol blend or heavy gasoline, the fuel amount and air amount just after starting are increased as compared with regular gasoline, and the ignition timing is also set to the spark advance side.

In this embodiment, controlling of the ignition timing just after starting to the spark advance side is carried out only for alcohol blend gasoline or heavy gasoline.

Next, processing in which the fuel properties are detected by the fuel properties sensor 16 for storage is described along the flowchart shown in FIG. 7 wherein in step S701, output of the fuel properties sensor 16 is fed through the analog interface 112 into the analog-to-digital converter 113 which then converts the analog signal into digital data of output voltage VF.

In detection of the fuel properties by the fuel properties sensor 16, the differences in the refractive indices of fuel can be used to distinguish between the fuel properties of regular gasoline and those of alcohol blend or heavy gasoline. However, when and just after the engine is started, that is, just after feeding of fuel into the engine is started, air, etc., is prone to mix with the fed gasoline or the power voltage supplied to the fuel properties sensor 16 is not stable, thus it is hard for the fuel properties sensor 16 to provide a stable detection output. If filter treatment is given to outputs of the fuel properties sensor 16 at normal stable running or outputs of the fuel properties sensor 16 are averaged and stored, accurate fuel properties can be detected.

Next, in step S702, the fuel temperature detected by the fuel temperature sensor 168 is converted into digital form by the analog-to-digital converter 113 to provide data of fuel temperature VFT. In step S703, based on the characteristic shown in FIG. 5, the output voltage VF data is calibrated to the output equivalent to the reference temperature. Assume that the correction value is VF1.

$$VF1 = VF*f(VFT)$$

In step S704, noise processing is applied to the fuel temperature correction value VF1 in order to remove noise from the output in view of the fact that the fuel properties do not frequently change. If K is selected in the range of 0 to 1 ($0 < K < 1$), output VF2 after filter is given is $$VF2(i) = K*VF2(i-1) + (1-K)*VF1$$

A primary filter is provided.

Instead of the filter treatment, average processing by the moving average method can be performed to remove noise.

Next, in step S705, it is judged whether the engine is stable at times other than when or just after it is started. When the engine is not stable, the fuel properties may not be detected accurately, thus the data is not stored in the RAM and the process is terminated.

When the engine is stable in step S705, the process proceeds to step S706 in which the output VF2 obtained from the filter treatment or average processing is stored in the RAM 114b in the CPU 114 and, even after the key switch is turned off, the stored value is retained to indicate the fuel properties at the next starting of the engine.

Figure 8:
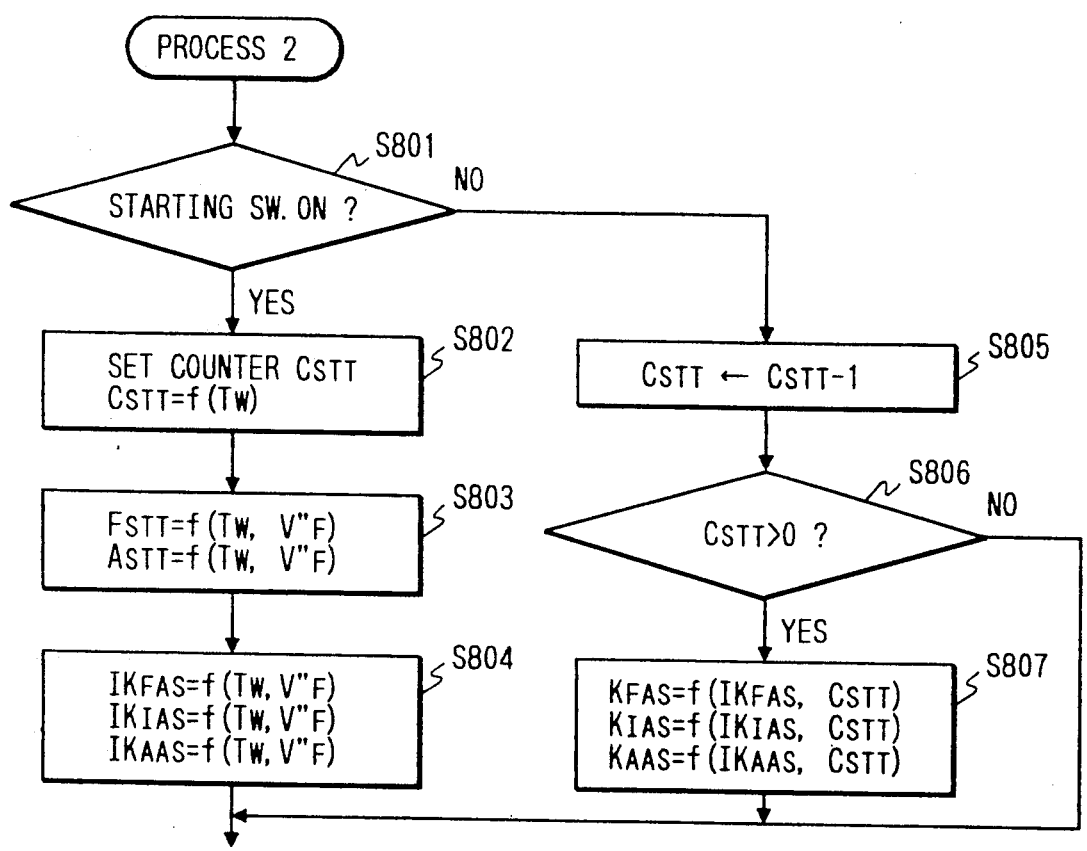
FIG. 8 is a flowchart showing an operation flow based on the timing chart in FIG. 6 when and just after the engine is started in the embodiment.

FIG. 8 is a flowchart showing an operation flow of the control device of the invention. The processing shown in the flowchart is prestored in the ROM 114a in the CPU 114 shown in FIG. 2. When power is supplied to the controller 11 by turning on the key switch (not shown), processing is repeated at predetermined time intervals, for example, every 5 ms.

In step S801 of FIG. 8, first a judgment is made as to whether the starting switch 9 is on, that is, the engine is in the starting state. If the engine is in the starting state, the process proceeds to step S802 and the value set in accordance with the engine temperature TW and the calculated and stored value according to output of the fuel properties sensor 16 is set in the just-after-starting counter CSTT to judge whether or not the engine is in the just-after-starting state. In the next step S803, the fuel amount FSTT and air amount ASTT at starting are set in accordance with the engine temperature TW and the calculated and stored value according to output of the fuel properties sensor.

Furthermore, in step S804, the fuel correction amount just after starting after the starting switch is turned off, IKFAS, the ignition time correction amount just after starting, IKIAS, and the air correction amount just after starting, IKAAS, are set in accordance with the engine temperature TW and the calculated and stored value according to output of the fuel properties sensor 16. These initial correction values are only calculated at starting, and not set in actual control.

In the following steps, the values such as the ignition time setup value at starting are calculated and signals are fed into the injector 12, the igniter 13, and the bypass control valve 6 shown in FIG. 2, thereby controlling the fuel amount, the ignition period, and the air amount.

The process to be executed, if the starting switch 9 is judged off in step S801, that is, the engine is in the just-after-starting state, is described below. When the starting switch 9 is judged off in step S801, the process branches to step S805 from step S801 and the value of the just-after-starting counter CSTT is decreased by one.

Next, the process proceeds to step S806, wherein a judgment is made as whether or not the value of the just-after-starting counter CSTT is greater than zero. If the value is greater than zero, the engine state is judged as the running state just after starting, and the initial correction values of the fuel amount, ignition period, and air amount just after starting calculated in step S804 are decreased gradually as shown in FIG. 6 in accordance with the value of the just-after-starting counter CSTT.

Here, detailed description of the correction values is omitted. Addition or subtraction is performed on the basic fuel amount, basic ignition period, and basic air amount obtained by the known method in the following steps, and the final fuel amount, basic ignition period, and basic air amount are calculated and fed as signals into the injector 12, the igniter 13, and the bypass control valve 6 as in the starting state, thereby controlling the fuel amount, the ignition period, and the air amount to the engine.

When the value of the just-after-starting counter CSTT is judged to be zero in step S805, it is assumed that the running state just after starting terminates, and the basic values calculated in the following steps are used to control the fuel amount, the ignition period, and the air amount to the engine.

According to the invention, fuel control, ignition timing control, and air amount control when and just after the engine is started are corrected in response to the calculated and stored value according to output of the fuel properties sensor, thus when fuel other than specific fuel is used, good control capabilities, when and just after the engine is started, can also be provided, thus eliminating trouble such as a starting failure or an engine failure just after starting.

What is claimed is:

1. An electronic control device for an internal combustion engine comprising:

a fuel properties sensor for detecting fuel properties and fuel temperature in the internal combustion engine;

calculation and storage means for calculating fuel properties detected by said fuel properties sensor, and correcting said fuel properties according to the fuel temperature detected by said fuel properties sensor, then calculating and storing at least one of a filtered value and an average value according to said corrected fuel properties; and control means responsive to the value stored in said calculation and storage means for correcting at least one of a fuel amount and an air amount fed to the engine when and just after the engine is started.

2. An electronic control device as claimed in claim 1, wherein said fuel properties sensor detects a refractive index of fuel to determine said fuel properties.

3. An electronic control device as claimed in claim 2, wherein said fuel properties sensor comprises:

light emitting means for emitting a light;

a rod prism for passing said light, the light passing through said rod prism being refracted at a boundary with said fuel in accordance with a ratio of refractive indices of both said rod prism and said fuel;

light reflecting means for reflecting said light from said rod prism;

light position detection means for detecting a position of said light reflected from said light reflecting means; and a fuel temperature sensor for detecting said fuel temperature.

4. An electronic control device as claimed in claim 1, wherein said calculation and storage means stores said at least one of a filtered value and an average value, only when said internal combustion engine is instable.

* * * * *